United States Patent [19]

Stewart et al.

[11] 4,296,269
[45] Oct. 20, 1981

[54] CONTROL OF ELECTRICAL ARC FURNACES

[75] Inventors: Alistair B. Stewart; Ian J. Barker, both of Randburg, South Africa

[73] Assignee: National Institute for Metallurgy, Randburg, South Africa

[21] Appl. No.: 915,194

[22] Filed: Jun. 13, 1978

[30] Foreign Application Priority Data

Jun. 29, 1977 [ZA] South Africa ....................... 77/3923
Jan. 20, 1978 [ZA] South Africa ....................... 78/0375

[51] Int. Cl.³ .............................................. H05B 7/18
[52] U.S. Cl. .............................................. 13/12
[58] Field of Search ........................................... 13/12

[56] References Cited

U.S. PATENT DOCUMENTS 3,431,344 3/1969 Borrebach ............................. 13/12
3,936,588 2/1976 Asphaug et al. .................... 13/12 X

OTHER PUBLICATIONS

Bretthauer et al., "A Contribution to the Theory of Three Phase Arc Furnaces", *Elektowarme International*, vol. 28, 1970, pp. 115–120.

Bretthauer et al., "The Measurement of Electrical Variables on the Secondary Side of Three Phase Furnaces", *Elektrowarme International*, vol. 29 (1971) pp. 381–387.

*Primary Examiner*—Gene Z. Rubinson
*Assistant Examiner*—Keith E. George
*Attorney, Agent, or Firm*—Cushman, Darby & Cushman

[57] ABSTRACT

A method of operating a multi-phase arc furnace by controlling the required values in the secondary circuits comprising the measurement and computation of such values from selected primary and/or secondary circuit measurements excluding secondary phase voltages measured with respect to the furnace bath, computing the desired values for effecting control of the furnace on the basis of an assumption that the behavior of the inductances of the secondary circuits is predictable during other variations in the particular furnace, and, applying such computed values to the furnace control optionally subject to any desired limits imposed on the variables of the furnace.

21 Claims, 5 Drawing Figures

CONTROL OF ELECTRICAL ARC FURNACES

This invention relates to the control of electrical arc furnaces and more particularly to the derivation of the conditions existing in the secondary (power) circuit of such a furnace to enable such control to be effected.

The effective control of arc furnaces in an attempt to optimise their efficiency or production rate, possibly within limits dictated by surrounding circumstances, is often hampered by the difficulty in measuring the required currents and voltages on the secondary side of the transformers which are usually powered by a three-phase electrical power supply. This results in a difficulty in measuring the power distribution within the furnace.

Whereas this invention could be applied to, and is intended to include within its scope, any "multi-electrode" furnaces, this description will refer to "three-electrode" furnaces which are the most common type. The "three-electrode" circuits can be considered as delta-star combinations wherein each part of the circuit can be represented by lumped parameters (inductance and resistance) which need not necessarily be linear in their behavior.

In a production furnace, the power is supplied through transformers with tap changers or other devices to enable the secondary voltages to be adjusted. Usually the following measurements (inter alia) are provided for:

(a) Primary voltages, phase to phase
(b) Primary currents (usually only the star currents but not always)
(c) Secondary star currents (derived from primary measurements and tap changer position)
(d) Secondary phase to phase voltages from points anywhere on the transformer, busbars, electrodes or attached conductors
(e) Secondary phase to furnace-bath voltages
(f) Transformer tap position.

The secondary measurements are of doubtful accuracy for the following reasons. Any voltage measurements in the secondary circuit which involve a measuring lead loop through which electromagnetic flux can pass will generally be erroneous as a result of magnetically induced voltages. It is possible to compensate for these induced error voltages if the secondary currents are known. This means that the secondary circuit electrical parameters, namely the three resistances and three inductances, might be determined by measuring (i) voltages with respect to the electrode bath, and (ii) the secondary circuit currents, and then computing the results by either analog or digital means. However, these methods involve a measurement connection to the furnace bath which is not always possible and this connection is not necessarily the neutral point voltage. Thus, in most cases, it is impossible to measure or calculate accurately the resistances and inductances solely from the secondary measurements.

The primary measurements are fundamentally more accurate than the secondary measurements. However, it is impossible to determine the secondary resistances and inductances from the primary measurements and transformer tap position without some other information.

It is one object of this invention to provide a method of controlling a furnace wherein the secondary circuit values are derived in a manner which will, in at least many cases, provide improved accuracy of results over the prior art methods referred to above, such values being used for controlling such a furnace.

Apart from the above described difficulty with prior art methods of controlling furnaces, such prior art methods have generally not provided means for limiting certain variables according to surrounding circumstances. It is in general desirable to place the following limits on the operation of a controller so that attempts are not made by the controller to cause a variable to pass such limits:

(a) limit individual electrode currents to avoid damage thereto; or
(b) limit the transformer current to avoid overheating thereof;
(c) limit the total power of the furnace. This may be necessary where, even if the transformer is capable of higher power outputs, electrical power is supplied at a rate dependant upon the "maximum demand". The latter may not be relevant where power is cheap (for example hydro-electric power) and such a limit would only be imposed where necessary.
(d) A limit on the apparent power or MVA of the transformers to avoid overheating thereof.
(e) The transformer output voltage can only be selected from those corresponding to the tap changer positions provided.
(f) The effective resistance of the furnace must fall within certain limits otherwise the operation of the furnace may become difficult.
(g) Additional limits apply while an electrode is being "baked-in".

In order to illustrate the possible effects of these limits in practice, FIG. 1 of the accompanying drawings gives a graphical illustration of how they apply to a hypothetical furnace.

In the graph, line 1 represents the line of maximum practical operating resistance of the furnace. Line 2 represents the line of minimum practical operating resistance thereof. Line 3 represents the electrode current limit and line 4 represents the transformer current limit. Line 5 represents the apparent power (MVA) limit. The set of curves 6 of power versus current has each member of the set corresponding to one tap changer position of the transformer. The allowable or at least preferred operating area is shown as a shaded area.

Clearly in some cases, one or more of the limits may be irrelevant as in the above case where the upper three tap changer positions are unusable and the transformer current limit is totally irrelevant. The latter is so because the electrode current limit is to the left of the transformer current limit in this example.

It is thus a secondary object of the invention to provide a method and system for controlling a furnace wherein the relevant limits of the above described type are adhered to.

In accordance with this invention a method of operating a multi-phase arc furnace by controlling the required values in the secondary circuits comprises the measurement and computation of such values from selected primary and/or secondary circuit measurements excluding secondary phase voltages measured with respect to the furnace bath, computing the desired values for effecting control of the furnace on the basis of an assumption that the behaviour of the inductances of the secondary circuits is predicable during other variations in the particular furnace, and, applying such computed values to the furnace control means optionally subject to any desired limits.

The assumption concerning the inductances of the secondary circuits is that they behave according to a predetermined pattern but often, if not in almost all cases, the assumption will be that the inductances remain equal to each other.

The computation of the values will generally be effected by means of an oil-line computer programmed to make the assumption set forth above and such a computer can be connected to effect the required control of the furnace or to indicate adjustments which should be made to provide the desired operation thereof. However, other computational aids could be employed in less sophisticated systems and the computation could be effected by hand calculator, although with difficulty. Also, depending on the predicted behaviour pattern of the inductances graphs may be capable of preparation to give values of the inductances according to changes in other variables in the furnace.

The invention thus also provides an electrical arc furnace control arrangement comprising means for detecting required values other than voltages relative to the furnace bath, computing means to which such required values are fed, said computing means being adapted to compute the required control values on the basis of an assumption that the inductances in the secondary circuits are predictable theoretically, and means for applying said control values to the furnace.

The inductances in the secondary or power circuits are governed mainly by the geometry of the current paths. Thus, the inductances are sensitive to the overall construction of the furnace, the location of the conducting paths within the burden, and the position and length of the electrodes. This means that assumptions such as the following are feasible:

L is the inductance of a particular circuit.

(a) $L_i = f_i(L_1, L_2, L_3)$, $i = 1,2,3$ (or equivalent formulae, including $L_1 = L_2 = L_3$).

(b) $L_i = f_i$(star voltages), $i = 1,2,3$, (or equivalent formulae).

(c) $L_i = f_i$(electrode currents), $i = 1,2,3$, (or equivalent formulae).

(d) $L_i = f_i$(hoist positions), $i = 1,2,3$, (or equivalent formulae).

(e) $L_i = f_i$(lumped star resistances), $i = 1,2,3$ (or equivalent formulae).

(f) $L_i = f_i$(electrode lengths), $i = 1,2,3$.

(g) Any combination of the above.

It is possible, therefore, to monitor or control the high power circuit and its associated equipment of a three-electrode open-arc or submerged-arc furnace for optimum production through a knowledge of the secondary circuit elements derived from primary or secondary measurements or both by using the selected assumption about the inductances. In the case of secondary measurements it is not necessary to measure voltages with respect to the furnace bath and therefore errors associated with such a measurement are avoided.

Figure 5:
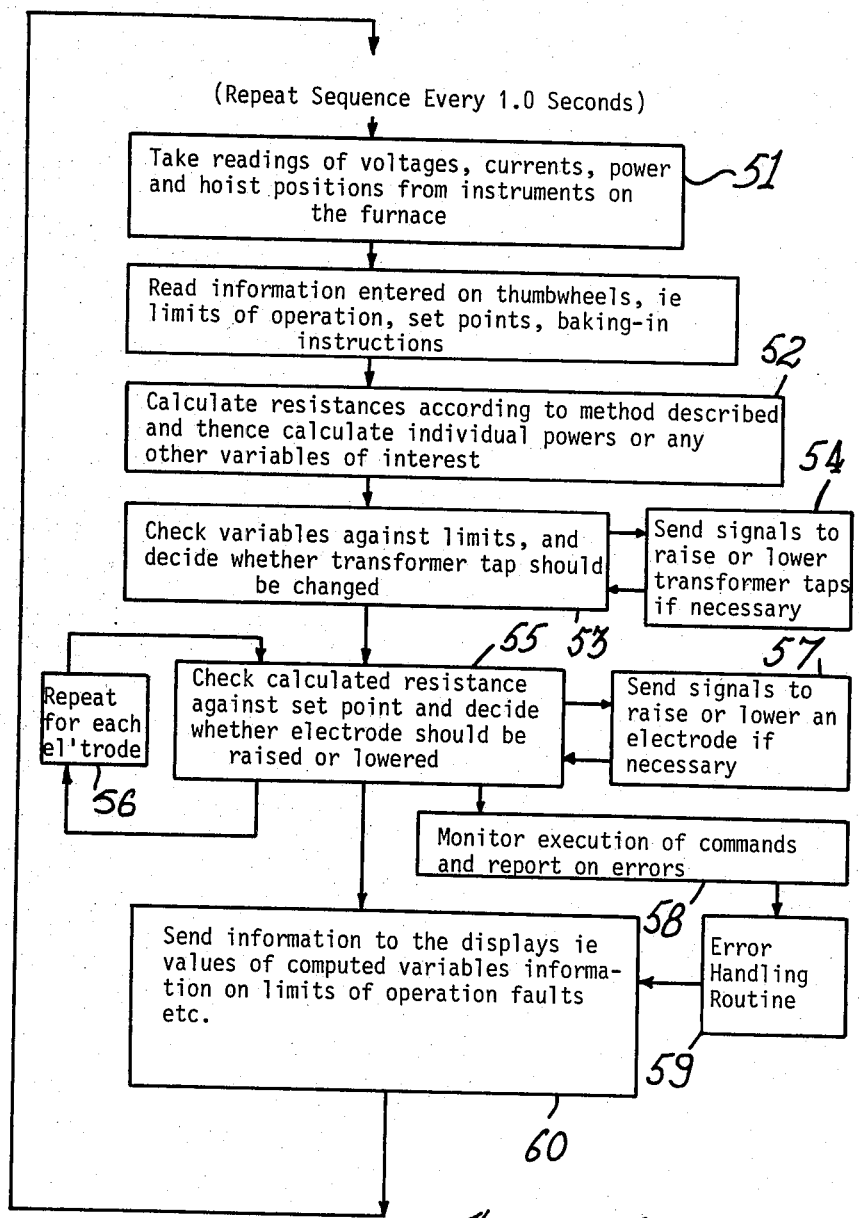

FIG. 5 outlines the actual programme followed by a computer in the controller unit.

An example of the theory of the implementation of the invention will now be described with reference to the relevant accompanying diagrams. The device, which is computer based, includes means 11 for measuring certain variables from a three phase arc furnace including a furnace bath 10 electrode 17 and associated equipment; carries out the required computation based on these variables to determine the state of certain electrical variables, in a controller unit 12; displays the state of these parameters for monitoring purposes on a display panel 13 on the controller unit, and issues commands to a normal control console 14 to adjust the tap changer positions of the transformer 15 and/or adjust individual electrode positions by means of an actuator 16 so as to maintain the electrical state of the furnace within certain desired limits and at substantially optimum conditions within such limits. The limits would be those described above and would simply be fed into a computer or the like together with a program embodying the assumption about the inductances.

The computer is connected to the instruments monitoring the furnace, and in this way, every control cycle (say every 1.0 second), it obtains, in this instance, the following measurements:

(i) Transformer tap position, K (ii) Transformer primary current $I_1'$, $I_2'$, $I_3'$, which can be scaled by the transformer ratio at tap position K to give secondary currents $I_1$, $I_2$, $I_3$.

(iii) Transformer primary voltages $V_{12}'$, $V_{23}'$, $V_{31}'$, which can be scaled down by the transformer ratio at tap position K to give secondary voltages $V_{12}$, $V_{23}$, $V_{31}$.

(iv) Total circuit power, P.

(v) Electrode hoist positions $h_1$, $h_2$, $h_3$.

Figure 3:
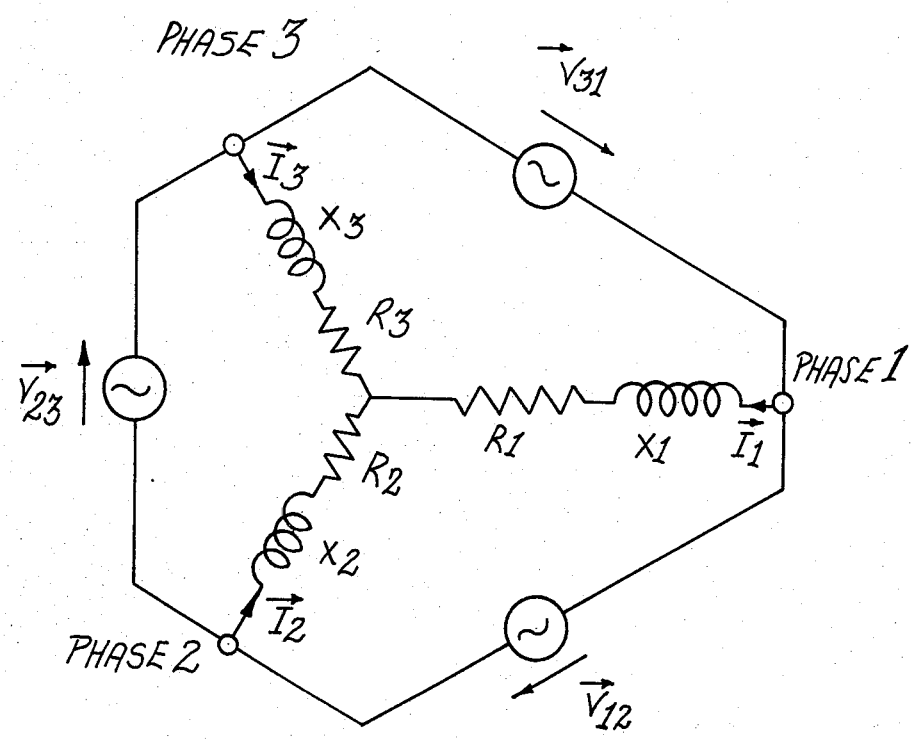
FIG. 3 is a simplified diagram of a secondary circuit of a furnace.

The power circuit of the furnace can be written as a star with reactances and resistances in each limb, fed from a delta voltage supply as shown in FIG. 3.

In this figure, the three phasor quantities $\vec{V}_{12}$, $\vec{V}_{23}$, $\vec{V}_{31}$ and $\vec{I}_1$, $\vec{I}_2$, $\vec{I}_3$, are complex numbers. The measured quantities $V_{12}$, $V_{23}$, $V_{31}$ and $I_1$, $I_2$, $I_3$, are the magnitudes of these phasors, and are real numbers. In the following equations and discussion $\theta_{12}$, $\theta_{23}$ and $\theta_{31}$ are the angles of the phasors $\vec{V}_{12}$, $\vec{V}_{23}$, $\vec{V}_{31}$ relative to a fixed datum. Thus by suitable choice of datum one of the angles $\theta$ may be chosen to be zero. We can write: (wherein $i = \sqrt{-1}$)

$$\left. \begin{array}{l} \vec{V}_{12} = V_{12} \exp(i\theta_{12}) \\ \vec{V}_{23} = V_{23} \exp(i\theta_{23}) \\ \vec{V}_{31} = V_{31} \exp(i\theta_{31}) \end{array} \right\} \quad (1)$$

Because the phasor voltages form a triangle, we can write:

$$\vec{V}_{12} + \vec{V}_{23} + \vec{V}_{31} = 0 \quad (2)$$

Through 2, the $\theta$ angles in equations 1 are interrelated and only one $\theta$ may be independently specified. By choosing, say, $\theta_{12}$ to be zero degrees, we can then calculate actual values for $\theta_{23}$ and $\theta_{31}$ from the measurements of $V_{12}$, $V_{23}$, $V_{31}$, using the cosine rule for a triangle. From these angles, we can calculate the phasors $\vec{V}_{12}$, $\vec{V}_{23}$, $\vec{V}_{31}$.

In the following, the angle $\beta$ is the angle of $\vec{I}_1$ relative to the same datum as used to determine the angles $\theta$.

The angles, $\phi_2$ and $\phi_3$ are the angles between $\vec{I_2}$ and $\vec{I_1}$, and between $\vec{I_3}$ and $\vec{I_1}$ respectively.

Thus with the currents, we may write:

$$\left.\begin{array}{l} \vec{I_1} = I_1 \exp(i\beta) \\ \vec{I_2} = I_2 \exp(i(\beta + \phi_2)) \\ \vec{I_3} = I_3 \exp(i(\beta + \phi_3)) \end{array}\right\} \quad (3)$$

and because the currents balance at the star point, $$\vec{I_1} + \vec{I_2} + \vec{I_3} = 0$$

Again the angles in equations (3) are inter-related. By writing the angles as shown in equations (3), $\phi_2$ and $\phi_3$ may be calculated from the measurements of $I_1$, $I_2$, $I_3$, leaving $\beta$ to be chosen independently.

The angle $\beta$ is related to the angles $\theta_{12}$, $\theta_{23}$, $\theta_{31}$ through the power, P. From the two-wattmeter method of measuring power, we may write:

$$P = \vec{I_2}\vec{V_{12}} + \vec{I_3}\vec{V_{13}} = \vec{I_2}\vec{V_{12}} - \vec{I_3}\vec{V_{31}}$$

(negative sign results from reversing the direction of $\vec{V_{13}}$ to $\vec{V_{31}}$) and therefore, $$P = I_2 V_{12} \exp i(\theta_{12} + \beta + \phi_2) - I_3 V_{31} \exp i(\theta_{31} + \beta + \phi_3) - \quad (5)$$

All the variables in equations (5) are known except $\beta$, and so $\beta$ can be calculated. From this $\beta$, together with $\phi_2$ and $\phi_3$, we can calculate the current phasors $\vec{I_1}, \vec{I_2}, \vec{I_3}$.

Now the resistances and reactances in each limb of the furnace circuit may be combined into complex impedances $$\left.\begin{array}{l} Z_1 = R_1 + iX_1 \\ Z_2 = R_2 + iX_2 \\ Z_3 = R_3 + iX_3 \end{array}\right\} \quad (6)$$

From the voltage balances in the circuit, we obtain $$\left.\begin{array}{l} \vec{I_2} Z_2 - \vec{I_1} Z_1 = \vec{V_{12}} \\ \vec{I_3} Z_3 - \vec{I_2} Z_2 = \vec{V_{23}} \\ \vec{I_1} Z_1 - \vec{I_3} Z_3 = \vec{V_{31}} \end{array}\right\} \quad (7)$$

Using subscripts R for real term and I for imaginary term $$\vec{I_1} = I_{1R} + iI_{1I} : \vec{I_2} = I_{2R} + iI_{2I} : \vec{I_3} = I_{3R} + iI_{3I}$$

$$\vec{V_{12}} = V_{12R} + iV_{12I} : \vec{V_{23}} = V_{23R} + iV_{23I} : \vec{V_{31}} = V_{31R} + iV_{31I}$$

Expanding equations numbered (7) above into real and imaginary parts we get:

$$\left.\begin{array}{l} (I_{2R} \times R_2 - I_{2I} \times X_2) - (I_{1R} \times R_1 - I_{1I} \times X_1) = V_{12R} \\ (I_{2I} \times R_2 + I_{2R} \times X_2) - (I_{1I} \times R_1 + I_{1R} \times X_1) = V_{12I} \end{array}\right\} \quad (8)$$

-continued $$\left.\begin{array}{l} (I_{3R} \times R_3 - I_{3I} \times X_3) - (I_{2R} \times R_2 - I_{2I} \times X_2) = V_{23R} \\ (I_{3I} \times R_3 + I_{3R} \times X_3) - (I_{2I} \times R_2 + I_{2R} \times X_2) = V_{23I} \end{array}\right\} \quad (9)$$

$$\left.\begin{array}{l} (I_{1R} \times R_1 - I_{1I} \times X_1) - (I_{3R} \times R_3 - I_{3I} \times X_3) = V_{31R} \\ (I_{1I} \times R_1 + I_{1R} \times X_1) - (I_{3I} \times R_3 + I_{3R} \times X_3) = V_{31I} \end{array}\right\} \quad (10)$$

In the above six equations there are six unknowns viz $R_1$, $R_2$, $R_3$, $X_1$, $X_2$ and $X_3$. However, one pair of equations (eg. those numbered (10)) is in effect a combination of the other two (eg. those numbered (8) and (9)) using the fact that $\vec{V}_{12} + \vec{V}_{23} + \vec{V}_{31} = 0$. This leaves four equations with six unknowns. If an assumption is made about the interrelationship between the reactances the four equations can be solved. This could be done in a number of ways, viz.:

(i) assume $X_1 = X_2 = X_3 = X$. Although this assumption does not give a totally accurate solution it does give a vastly improved result over the alternative technique which uses measurements of electrode to furnace bath voltages. In this case the four unknowns are, therefore, $R_1$, $R_2$, $R_3$, $X$.

(ii) assume $$X_1 = X + f(l_1)$$

$$X_2 = X + g(l_2)$$

$$X_3 = X + h(l_3)$$

Here each reactance is assumed to have a common basic term plus a term dependent on the electrode lengths $l_1$, $l_2$, $l_3$.

(iii) Other assumptions are possible based on interrelationships stated above.

Having calculated the resistances as shown above, the controller then must decide whether an electrode should be moved or not, in order to achieve a desired resistance. Desired set points for the resistances would have been entered previously into the controller.

To decide whether to move an electrode, the raw calculated resistances are first put through a digital filter to smooth them. If F is the filtered value of $R_1$ and $\alpha$ is a constant related to the time constant of the filter then the filter equation is:

$$F_n = \alpha F_o + (1 - \alpha) R_1 \quad (8)$$

where $F_n$ is the present value, and $F_o$ is the immediately preceding value. This filtered value F is allowed to remain within a small deadband around the set point without any action being taken. Should the value of F go outside the deadband, then a pulse will be sent out to the actuating mechanism to cause the electrode to move up or down accordingly. The length of this pulse will be proportional to the difference between $R_1$ and the set point. Of course, it is necessary to check that pulses lie within a reasonable range, to prevent any abnormal behaviour.

At the same time as $R_1$ is being checked as explained above, so $R_2$ and $R_3$ are likewise checked and the corresponding action taken accordingly. In addition to the resistances, the limits of operation are also checked.

In the case of the limits of operation, the real power P, voltages $V_{12}$, $V_{23}$, $V_{31}$, currents $I_1$, $I_2$, $I_3$, and the apparent power (including the reactive component)

which may be easily calculated as part of the resistance calculations, are all compared against their limits. Of these variables, only the one nearest its limit is then examined further. The decision procedure is similar to the resistance decision procedure. The ratio of the highest variable to its limit is again filtered. If this filtered value goes outside the small deadband around 1.0 (note: when variable=limit, then ratio=1.0), the transformer taps are raised or lowered accordingly.

We have thus described above how the controller performs the task of controlling the electrical side of the furnace. In addition to this, it can also display variables which it has measured or calculated, and also indicate its status such as which limit it is operating against. By watching whether an electrode has moved or not after sending out a pulse to move it, the controller can provide a warning if a hoist mechanism gets stuck. This type of check makes it safer for a furnace to be run completely automatically under the controller, as the controller can summon help when it is needed.

In the practical implementation of the invention the variables mentioned are measured and the computation, indicated above, performed. At present the determination of electrode length involves measuring the electrodes periodically and using the resulting computed powers for each electrode in an electrode erosion model to predict the erosion of the electrodes. By measuring electrode slipping as well, a reasonably accurate electrode length determination is possible.

Figure 1:
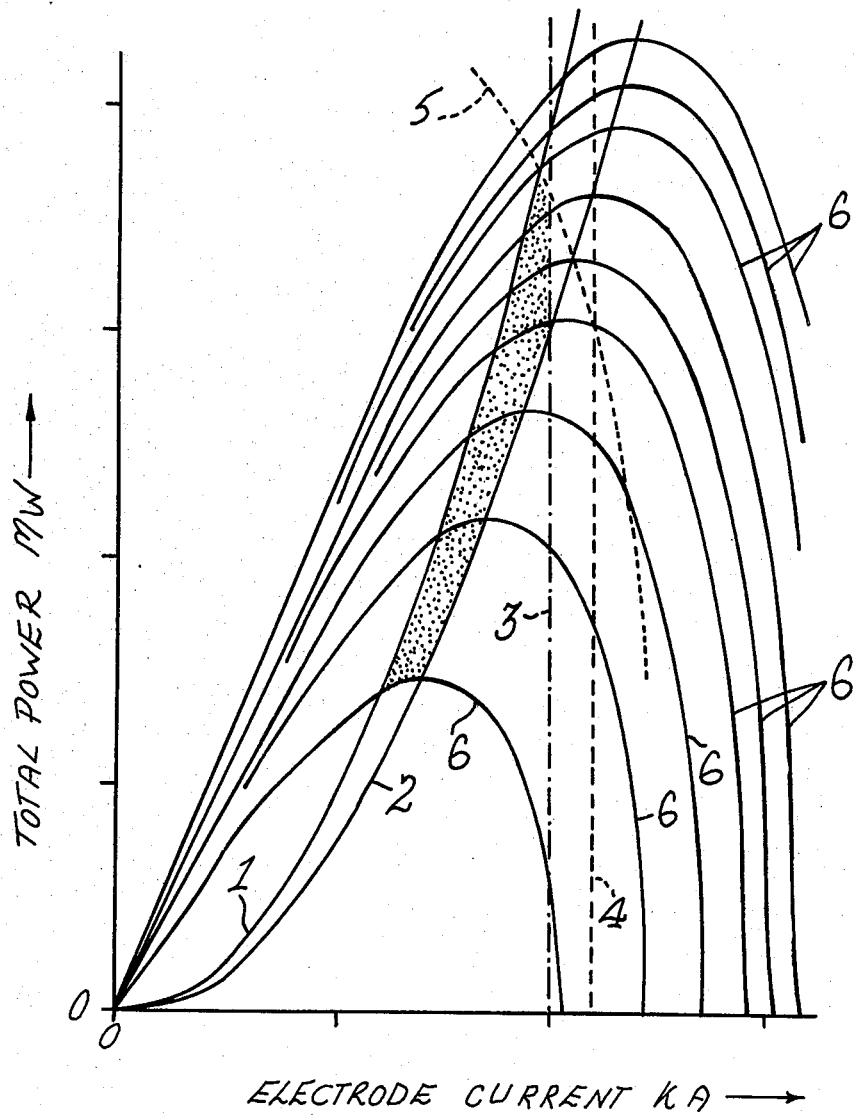
FIG. 1 is as described above.
Figure 2:
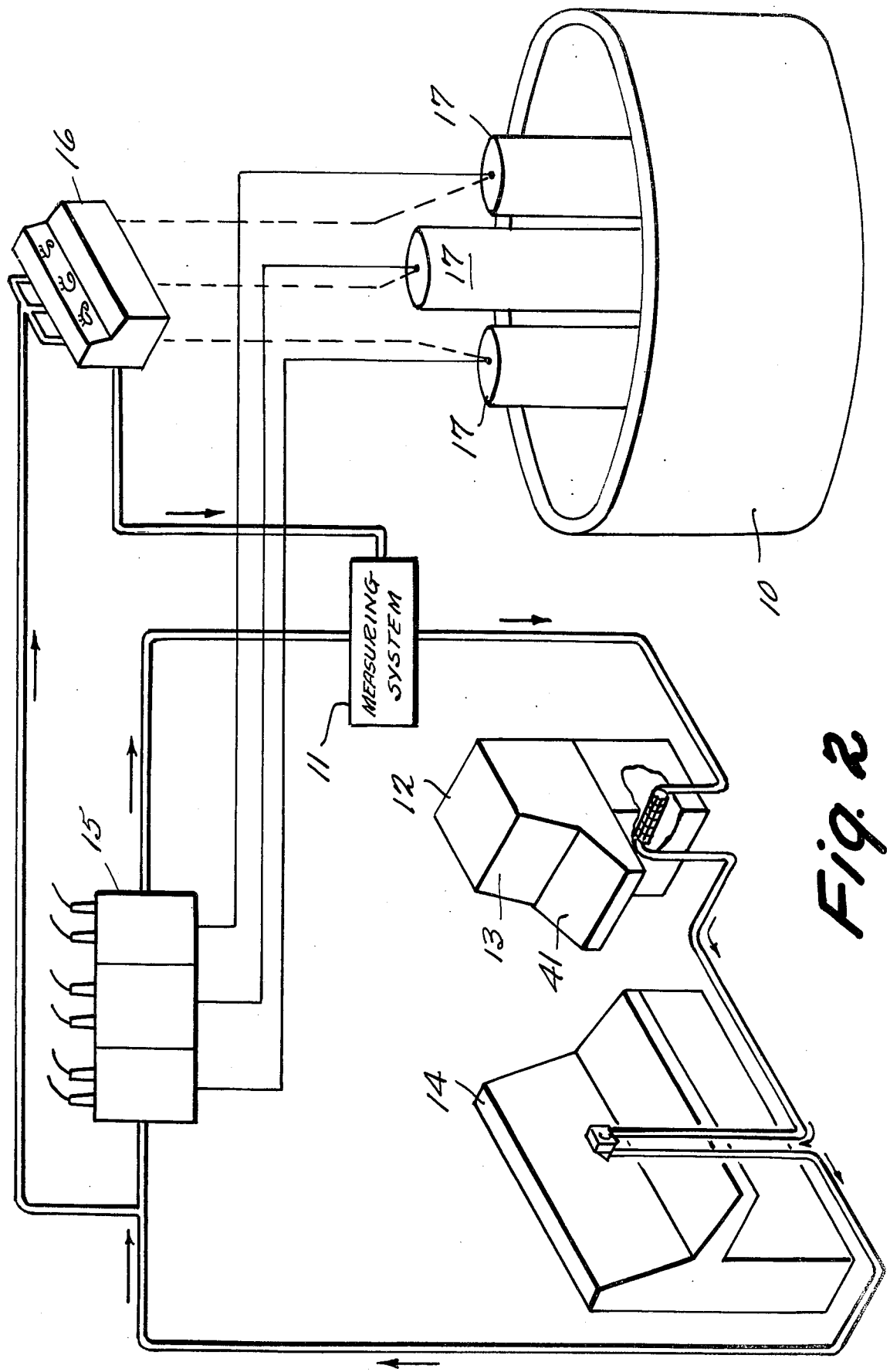
FIG. 2 shows a block diagram of the device as connected to a typical furnace.

In practice a computer of a suitable type, preferably, but not necessarily, connected on-line to a furnace will be used. A program will be fed to the computer embodying the assumption concerning the inductances of the furnace. The program also preferably embodies limits as above described to ensure that the furnace is not operated outside the predetermined range of the type shown by way of example in FIG. 1. Alternatively, the limits may be made to be variable, if required, and in such a case thumbwheel switches 40 can be provided in a control panel 41 for setting the required limits from time to time. Thumbwheel switches on the panel 41 can also be provided for selecting the information to be displayed on the display panel 13, if the latter is made to display only one value at a time per phase.

In addition to the above it is preferred to include in the program an alternative set of varying limits to be used, in respect of any one electrode, while it is being "baked-in". Baking-in one or more electrodes can be done automatically with the controller. It is indeed preferable to "bake-in" under computer control, as manual control with a furnace imbalance, which accompanies "baking-in", often leads to a worse imbalance, and further trouble.

A "baking-in" schedule consists of starting off at a lower current than normal, and gradually increasing the current by raising transformer taps until the normal operating current is reached. During this "baking-in" the electrode must not be moved, for fear of a "green break". Selection of such a "baking-in" schedule would be made manually on the controller by a selector switch on the thumbwheel panel 41.

The computer controlling unit has outputs which are adapted to alter the tap changer positions and raise or lower the electrodes independently as required. The output is preferably variable, in so far as the extent of the control action is concerned, in order to provide a correcting action in the settings of the furnace proportional to the deviation from the required values at a particular time.

The controlling unit preferably has either a print output or a display to enable an operator to determine exactly the condition of the furnace at any one time. The displayed information may be the electrode current, power, tap position, the limiting factor being operated against at a specific time, whether or not an electrode is on a "baking-in" program and the like. The controller may thus be made to provide any required information at any desired time. Also, it may be adapted to detect a fault condition in the furnace, such as an electrode not moving as instructed, and give a descriptive warning.

Figure 4:
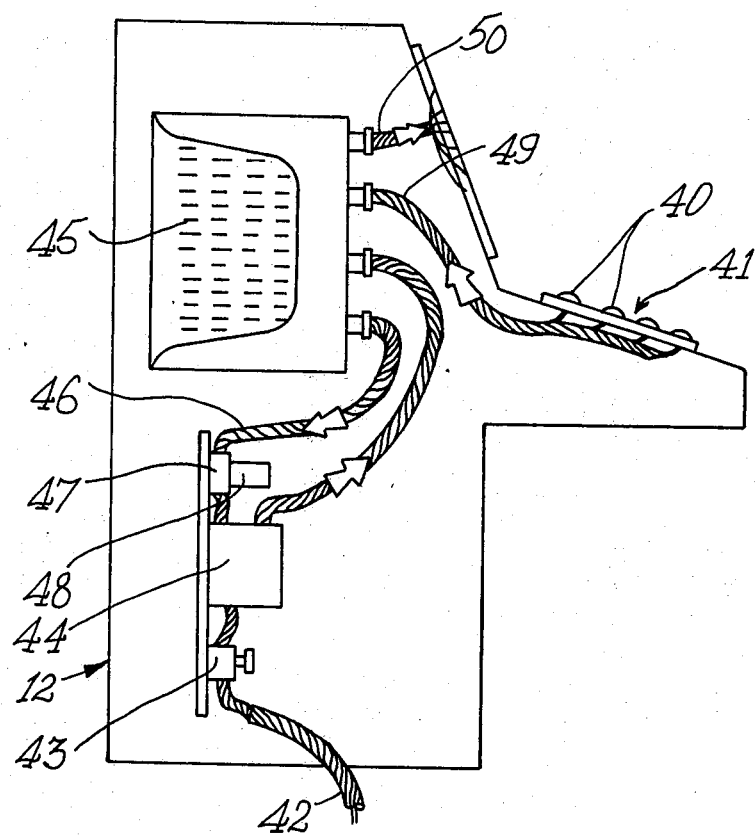
FIG. 4 is a schematic sectional side elevation of a controller unit.

The above operation of a computer controlled furnace will now be further described with reference specifically to FIGS. 4 and 5 of the accompanying drawings. Cables 42 to and from the instruments on the furnace are connected to a terminal strip 43 in the controller body 12 and the connections are then made to convertors 44 for converting the signals from the furnace to computer compatible signals. From the convertors the signals are then fed to the computer electronics 45. An output 46 from the computer electronics is fed to an interface circuitry panel 47 which controls relays 48 controlling the electrical power supply to the furnace control instruments.

The computer electronics have a further input 49 from the thumbwheel panel so that the values selected on the thumbwheel switches are fed to the computer electronics. A further output 50 from the computer electronics is connected to provide the required values on the display panel as required or designed.

The computer electronics are programmed to, in this case, repeat a sequence of steps every one second. The sequence of steps to be carried out by the computer are shown in FIG. 5. The first step is for the computer to examine the readings of voltages, currents, power and hoist positions from the instruments on the furnace this operation being indicated at block 51 in FIG. 5. At the same time the information entered on the thumbwheel switches is read and the resistances and other values required are calculated according to the afore-described method at step 52. The next step 53 is to check the variables against the limits and decide whether the transformer tap positions should be changed. It is at this step 53 that the deadband technique described above is applied to the readings in order to decide whether or not the transformer tap positions should be changed. If the tap positions are to be changed the computer sends a signal to raise or lower one or more of the transformer tap positions as necessary as indicated by block 54.

The next step is to check the calculated resistance against the set point of resistance and decide whether one or more electrodes should be raised or lowered. In fact each electrode is treated separately in rotation and therefore the repeat sequence is indicated by block 56 in FIG. 5. If the results of this calculation indicate that one or more electrodes should be raised or lowered the computer sends signals to the furnace control to raise or lower an electrode as necessary as indicated by block 57.

The fact of whether or not the commands issued by the computer are executed are monitored at block 58 and if any errors are noted the computer activates an error handling routine 59 which will result in an alarm being given or an error being indicated on the display panel as may be required. All the information as to whether or not a tap position has been raised or lowered or an electrode raised or lowered as well as errors which have been noted are sent to the display from the computer as indicated by block 60. All information can be connected to be displayed on the display panel and therefore it will be an easy matter for a furnace operator to establish against which limit the furnace is operating.

It will be understood from the above that a microcomputer will be adequate for the purposes of carrying out the control on an arc furnace and the computer can easily be programmed by a computer programmer.

It will be appreciated that the exact mechanical and electrical operation of the controller may be implemented by anyone skilled in the art of furnace control and the computer programme necessary will be easily written by a computer programmer.

It will be understood by those skilled in the art that the invention may be implemented in various ways and by means of a variety of different types of computers to achieve any particular desired control of arc furnaces.

What we declare as new and desire to secure by Letters Patent is:

1. A method for controlling operating conditions of a multi-phase arc furnace, said furnace including a furnace bath, a transformer system defining a primary circuit and a secondary circuit, furnace control means, and electrodes operatively connected to the furnace control means and electrically connected to said secondary circuits, each of said electrodes, in conjunction with said furnace bath, having a reactance the method comprising the steps of:
   measuring currents and voltages on at least one of said primary circuit and secondary circuit, excluding secondary phase voltages measured with respect to the furnace bath, and producing measurement signals related to said secondary circuit currents and voltages;
   generating condition signals related to said operating conditions from said measurement signals on the basis that each said reactance is related to each other said reactance by an assumed relationship;
   comparing the condition signals with predetermined signals; and
   operating the furnace control means in accordance with any deviation of said condition signals from said predetermined signals to cause the conditioned signals to approach said predetermined signals.

2. A method as in claim 1 wherein said generating, comparing and operating steps are effected by means of a computer programmed to operate on the basis of said assumed relationship.

3. A method as in claim 1 wherein said assumed relation is that each said reactance is equal to each other said reactance.

4. A method as in claim 1 further comprising the step of controlling at least one of said electrodes to impose special limits on the conditions thereof while said at least one of said electrodes is being "baked-in", the remainder of the furnace remaining under normal control.

5. A method as in claim 1 wherein:
   said condition signals include signals related to resistances of said electrodes and circuits connected to said electrodes;
   said comparing step compares said resistance signals; and
   said control means operating step alters the position of said electrodes to alter the resistance towards a desired value.

6. A method as in claim 5 wherein said control means operating step alters the resistance of the electrodes only when said condition signals vary from the desired values by more than a pre-determined amount thereby providing a deadband in which no control activity is actuated.

7. A method as in claim 1 wherein said measuring step further comprises the steps of measuring:
   (i) Transformer tap position, K
   (ii) Transformer primary current $I_1'$, $I_2'$, $I_3'$, which can be scaled by the transformer ratio at tap position K to give secondary currents $I_1$, $I_2$, $I_3$,
   (iii) Transformer primary voltages $V_{12}'$, $V_{23}'$, $V_{31}'$, which can be scaled down by the transformer ratio at tap position K to give secondary voltages $V_{12}$, $V_{23}$, $V_{31}$,
   (iv) Total circuit power P,
   (v) Electrode hoist position $h_1$, $h_2$, $h_3$.

8. A method as in claim 7 wherein said generating step is effected by solution of any two pairs of the following three pairs of equations or their equivalents using the assumption that the behavior of said reactances is predictable:

$$\left.\begin{array}{l}(I_{2R} \times R_2 - I_{2I} \times X_2) - (I_{1R} \times R_1 - I_{1I} \times X_1) = V_{12R} \\ (I_{2I} \times R_2 + I_{2R} \times X_2) - (I_{1I} \times R_1 + I_{1R} \times X_1) = V_{12I}\end{array}\right\} \quad (8)$$

$$\left.\begin{array}{l}(I_{3R} \times R_3 - I_{3I} \times X_3) - (I_{2R} \times R_2 - I_{2I} \times X_2) = V_{23R} \\ (I_{3I} \times R_3 + I_{3R} \times X_3) - (I_{2I} \times R_2 + I_{2R} \times X_2) = V_{23I}\end{array}\right\} \quad (9)$$

$$\left.\begin{array}{l}(I_{1R} \times R_1 - I_{1I} \times X_1) - (I_{3R} \times R_3 - I_{3I} \times X_3) = V_{31R} \\ (I_{1I} \times R_1 + I_{1R} \times X_1) - (I_{3I} \times R_3 + I_{3R} \times X_3) = V_{31I}\end{array}\right\} \quad (10)$$

wherein $I_{1R}$, $I_{2R}$ and $I_{3R}$ are the real components of secondary circuit currents, $I_{1I}$, $I_{2I}$ and $I_{3I}$ are the imaginary components of secondary circuit currents, $R_1$, $R_2$ and $R_3$ are the resistance of the electrode circuits, $X_1$, $X_2$ and $X_3$ are the reactances of the electrode circuits, $V_{12R}$, $V_{23R}$ and $V_{31R}$ are the real components of the secondary circuit voltages and $V_{12I}$, $V_{23I}$ and $V_{31I}$ are the imaginary components of secondary circuit voltages.

9. A method as in claim 1 wherein said assumed relationship is that each said reactance is equal to each other said reactance, i.e. $X_1 = X_2 = X_3$ wherein $X_1$, $X_2$ and $X_3$ are the reactances of the electrodes in conjunction with said furnace bath.

10. A method as in claim 1 wherein said assumed relationship is that:

$$X_1 = X + f(l_1)$$
$$X_2 = X + g(l_2)$$
$$X_3 = X + h(l_3)$$

wherein $X_1$, $X_2$ and $X_3$ are the reactances of the electrodes in conjunction with said furnace bath, X is a common basic term, $l_1$, $l_2$ and $l_3$ are lengths of the electrodes and f, g and h are functions.

11. A method as in claim 1 wherein said transformer system includes tap changers locatable in any of a plurality of positions and said method further comprises the step of operating said transformer tap changers to insure that not one of a plurality of said measurement and condition signals exceeds predetermined limits.

12. A method as in claim 11 wherein said plurality of said measurement signals and said condition signals consists of said condition signals.

13. A method as in claim 11 wherein said plurality of said measurement and condition signals are selected from the group consisting of individual electrode current; individual transformer currents; total real power being consumed by the furnace; apparent power (MVA) of the transformers; and resistance and voltage of the furnace.

14. A method as in claim 13 wherein said limits are selected by means of manually operable selector switches.

15. Apparatus for controlling operating conditions of a multi-phase arc furnace, said furnace including a furnace bath, a transformer system defining a primary circuit and a secondary circuit, furnace control means, and electrodes operatively connected to the furnace control means and electrically connected to said secondary circuit, each of said electrodes, in conjunction with said furnace bath, having a reactance, the apparatus comprising:
   means for detecting currents and voltages on at least one of said primary circuit and secondary circuit other than secondary phase voltages relative to the furnace bath and producing measurement signals related to said secondary circuit currents and voltages;
   means, responsive to said measurement signals, for generating condition signals related to said operating conditions on the basis that each said reactance is related to each other reactance by an assumed relation; and
   means for operating said furnace in accordance with said condition signals.

16. Electrical arc furnace control apparatus as in claim 15 wherein said means for detecting detect:
   (i) Transformer tap position K,
   (ii) Transformer primary current $I_1'$, $I_2'$, $I_3'$, which can be scaled by the transformer ratio at tap position K to give secondary currents $I_1$, $I_2$, $I_3$,
   (iii) Transformer primary voltages $V_{12}'$, $V_{23}'$, $V_{31}'$, which can be scaled down by the transformer ratio at tap position K to give secondary voltages $V_{12}$, $V_{23}$, $V_{31}$,
   (iv) Total circuit power, P, and
   (v) Electrode hoist position $h_1$, $h_2$, $h_3$.

17. Electrical multi-phase arc furnace control apparatus as in claim 15 or 16 wherein said generating means solves two of the following three pairs of simultaneous equations on the basis that said reactances are predictable:

$$\left.\begin{array}{l}(I_{2R} \times R_2 - I_{2I} \times X_2) - (I_{1R} \times R_1 - I_{1I} \times X_1) = V_{12R} \\ (I_{2I} \times R_2 + I_{2R} \times X_2) - (I_{1I} \times R_1 + I_{1R} \times X_1) = V_{12I}\end{array}\right\} (8)$$

$$\left.\begin{array}{l}(I_{3R} \times R_3 - I_{3I} \times X_3) - (I_{2R} \times R_2 - I_{2I} \times X_2) = V_{23R} \\ (I_{3I} \times R_3 + I_{3R} \times X_3) - (I_{2I} \times R_2 + I_{2R} \times X_2) = V_{23I}\end{array}\right\} (9)$$

$$\left.\begin{array}{l}(I_{1R} \times R_1 - I_{1I} \times X_1) - (I_{3R} \times R_3 - I_{3I} \times X_3) = V_{31R} \\ (I_{1I} \times R_1 + I_{1R} \times X_1) - (I_{3I} \times R_3 + I_{3R} \times X_3) = V_{31I}\end{array}\right\} (10)$$

wherein $I_{1R}$, $I_{2R}$ and $I_{3R}$ are the real components of secondary circuit currents, $I_{1I}$, $I_{2I}$ and $I_{3I}$ are the imaginary components of secondary circuit currents, $R_1$, $R_2$ and $R_3$ are the resistances of the electrode circuits, $X_1$, $X_2$, and $X_3$ are the reactances of the electrode circuits, $V_{12R}$, $V_{23R}$ and $V_{31R}$ are the real components of the secondary circuit voltages and $V_{12I}$, $V_{23I}$ and $V_{31I}$ are the imaginary components of secondary circuit voltages.

18. Electrical multi-phase arc furnace control apparatus as in claim 17 wherein said generating means generates said condition signals on the basis that each said reactance is equal to each other said reactance i.e. $X_1 = X_2 = X_3$ wherein $X_1$, $X_2$ and $X_3$ are the reactances of the electrodes in conjunction with said furnace bath.

19. Electrical multi-phase arc furnace control apparatus as in claim 15 wherein said generating means is a suitably programmed computer.

20. Electrical multi-phase arc furnace control apparatus as in claim 15 wherein said operating means includes a normal control console and actuator assembly.

21. Electrical multi-phase arc furnace control apparatus as in claim 15 wherein said transformer system includes tap changers locatable in any of a plurality of positions and said apparatus further comprises means for operating said transformer tap changers to insure that not one of a plurality of said measurement and condition signals exceeds predetermined limits.

* * * * *